United States Patent [19]

Bergmann

[11] Patent Number: 4,842,191
[45] Date of Patent: Jun. 27, 1989

[54] TEMPERATURE-CONTROLLED MIXING FITTING

[75] Inventor: Konrad Bergmann, Wittlich, Fed. Rep. of Germany

[73] Assignee: American Standard Inc., New York, N.Y.

[21] Appl. No.: 190,446

[22] Filed: May 5, 1988

[30] Foreign Application Priority Data

May 28, 1987 [DE] Fed. Rep. of Germany ....... 3718039

[51] Int. Cl.⁴ ............................................. G05D 23/13
[52] U.S. Cl. .................................. 236/12.12; 137/884; 251/129.03; 251/129.11
[58] Field of Search ...................... 236/12.12; 137/884; 251/129.11; 364/557

[56] References Cited

U.S. PATENT DOCUMENTS

| | | | |
|---|---|---|---|
| 4,399,836 | 8/1983 | Versterre et al. | 137/884 X |
| 4,420,811 | 12/1983 | Tarnay et al. | 365/510 |
| 4,688,277 | 8/1987 | Kakinoki et al. | 4/623 |
| 4,711,392 | 12/1987 | Kidouchi et al. | 236/12.12 |

FOREIGN PATENT DOCUMENTS

| | | |
|---|---|---|
| 2836698 | 3/1980 | Fed. Rep. of Germany . |
| 30307 | 2/1982 | Fed. Rep. of Germany . |
| 31465 | 1/1983 | Fed. Rep. of Germany . |
| 34254 | 2/1985 | Fed. Rep. of Germany . |
| 34301 | 3/1985 | Fed. Rep. of Germany . |
| 34077 | 9/1985 | Fed. Rep. of Germany . |

*Primary Examiner*—William E. Wayner
*Attorney, Agent, or Firm*—James J. Salerno, Jr.; Robert G. Crooks; John P. Sinnott

[57] ABSTRACT

An electronically operated mixing valve is disclosed wherein a combination of a control module which houses the electronics for electrically operating a valve module having one or more valves for mixing, shut-off and distribution of mixed water which is in contact with at least one temperature sensor, and an electromechanical motor module which is electrically connected to the valve module for automatically operating the one or more valves.

6 Claims, 8 Drawing Sheets

TEMPERATURE-CONTROLLED MIXING FITTING

BACKGROUND OF THE DISCLOSURE

Field of the Invention

Mixing fittings of this kind have not come into widespread use to date. The reasons for this lie not only in the comparatively high cost of such fittings, but also and especially in a complicated manufacturing technology in combination with a design not very amenable to installation and repair.

SUMMARY OF THE INVENTION

The object of the invention is to eliminate these disadvantages and so provide a mixing fitting wherein the complex details do not present manufacturing problems and whose components are structural and functional units, dependable in operation, easy to install, interconnectable and readily replaceable. Also, the fitting is easily actuated manually in the event of power failure.

This object is accomplished essentially by the structural combination of several modules, namely:

1. a valve module having one or more valves for mixing, shutoff and/or distribution, with one or more temperature sensors but at least one temperature sensor for the mixed water,
2. an electromechanical motor module having electrical contacts for automatic contacting with the temperature sensor or sensors and means for automatic coupling of the electric drives to the valve or valves, and
3. a control module which houses the electronics.

BRIEF DESCRIPTION OF THE DRAWINGS

In the drawings, the invention is represented by two embodiments by way of example, to wit.

FIG. is an enlarged fragmentary elevational view, partly in section, of the coupling means of the cold or hot water valves and the associated motor.

DETAILED DESCRIPTION OF THE PREFERRED EMBODIMENT

In the figures, 7 designates a valve module having a cold water inlet 9, a hot water inlet 8 and mixed water outlets 10, e.g. for tub or shower use. In valve module 7, there are openings 11 to accommodate hot and cold water valves 12,13 and a three-way valve 14, FIG. 7. The valves include coupling means in the form of flanges 15 and are threaded on the valve spindles 16. The valves include tooth profiles 17 which are engaged by coupling means of a motor reducer module 13. Valve module 7 further has temperature sensors 19 for cold, hot and mixed water reducers 20. Sound absorbers are provided on the cold and hot water sides of valve module 7.

Figure 8:
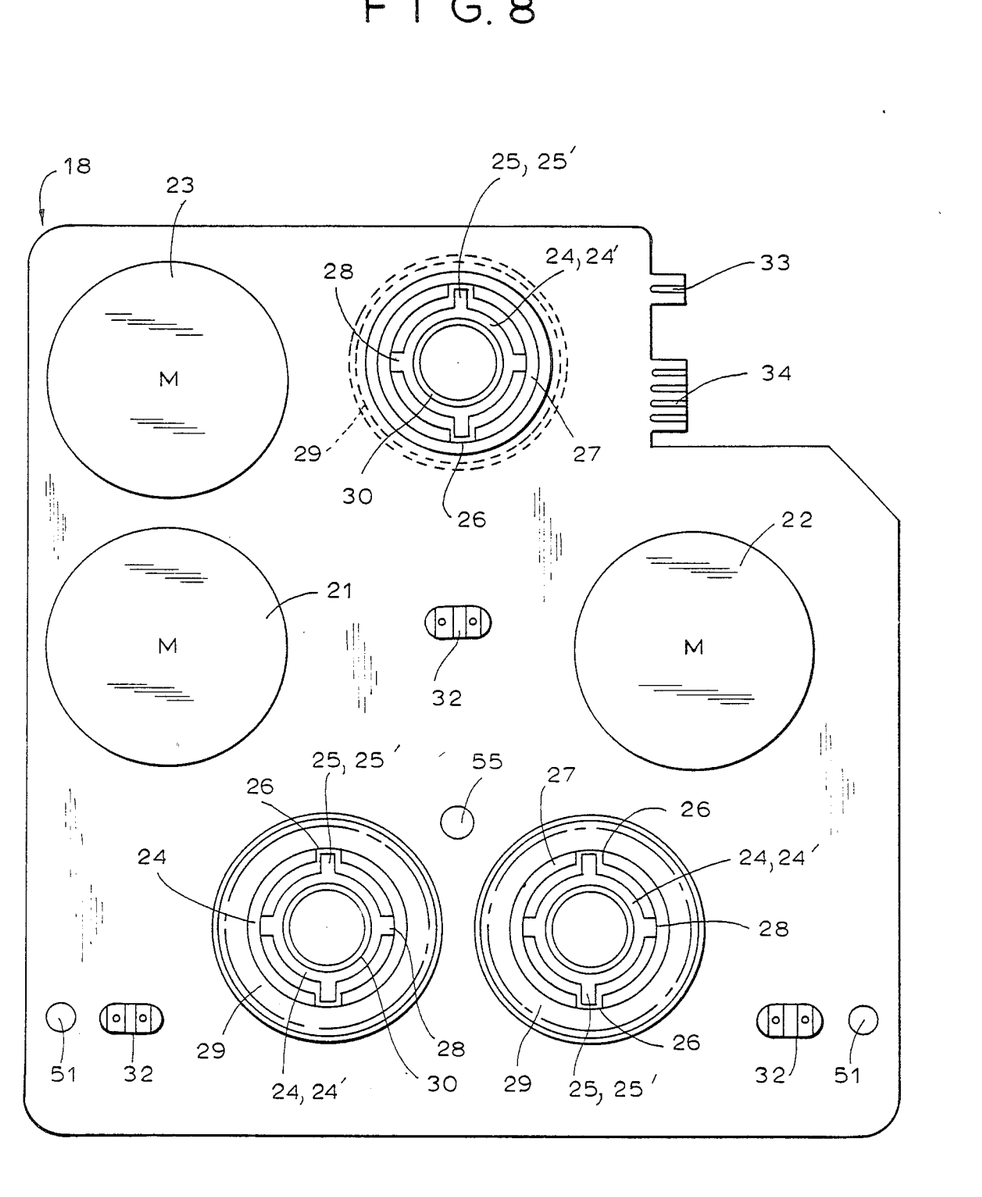
FIG. 8 is a front plan view, in elevation, of the motor-reducer module.

Motor reducer module 18, FIG. 8, has a motor 21 for cold water, a motor 22 for hot water, and a motor 23 for mixed water. The motors are each associated with reducing gears, not shown, cooperating with the coupling means of motor reducer module 18. These coupling means comprise spring cross-couplings 24, shown in FIG. 9, its longer fingers 25 engaging frontal recesses 26 of coupling gears 27, while the shorter, projecting spring fingers 28 engage teeth 17 of coupling flanges 15 of valves 12,13,14. The coupling means of motor reducer module 18 further comprises gears 29 fixedly connected to coupling gears 27 and rotatable together with them, are stationary bearings 30, while on the other hand, coupling gears 27 with the motor transmissions, not shown. In the event of a power failure, however, the transmissions of cold and hot water motors 21,22 can be uncoupled. A decoupling of the transmission of smaller motor 23 to control the mixed water and, hence, three-way valve 14 may be provided in the embodiments shown.

Figure 9:
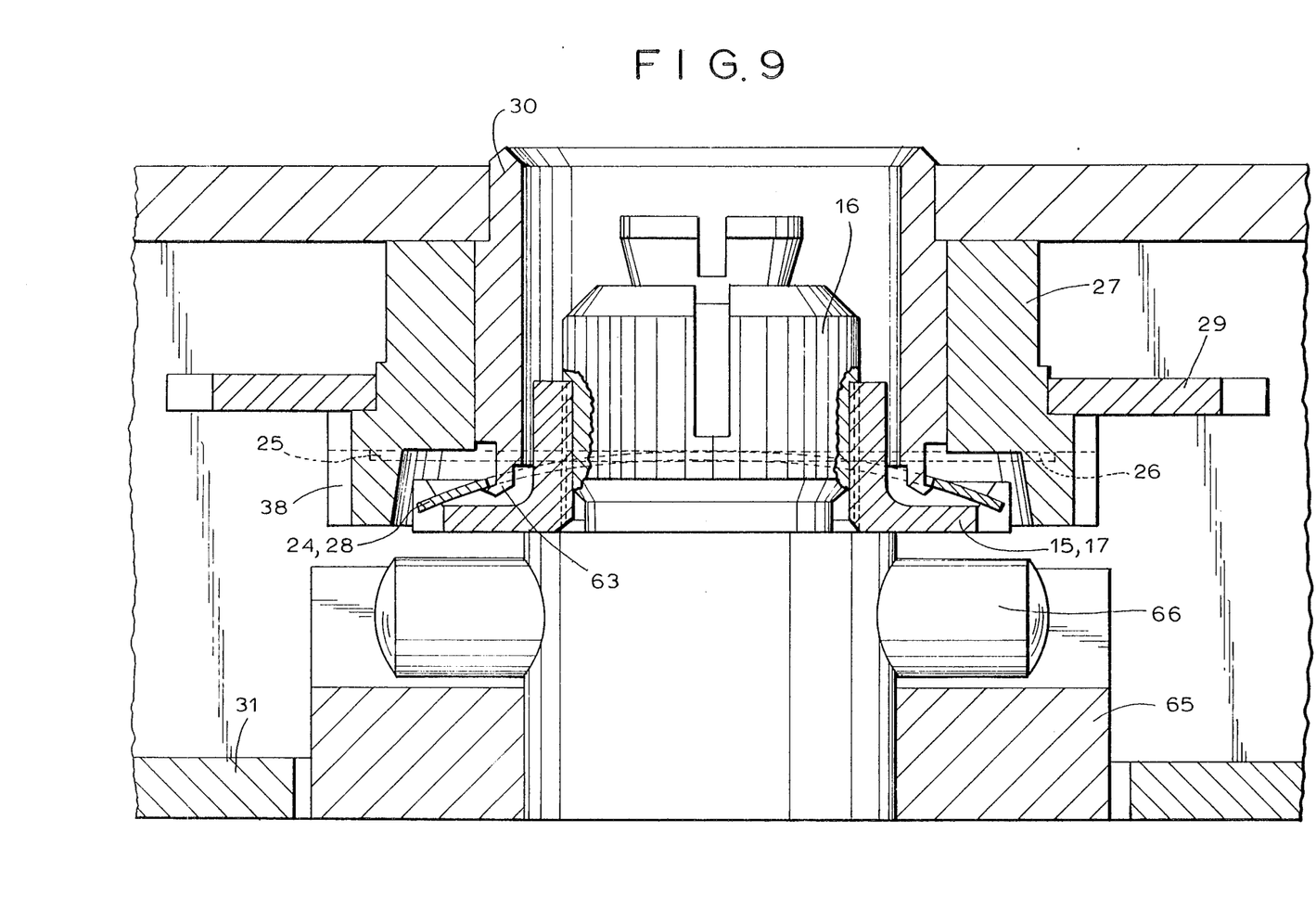

Motor reducer module 18, at the end facing valve module 7, is provided with a wall serving as conductor plate 31, FIG. 9 which, in addition to electric spring contacts 32 for temperature sensors 19 and motors 21,22,23, is provided with plug contacts 33 for connection to the supply voltage of a transformer, not shown, and a bar 34 to deliver the supply voltage to the electronics of control 35, having a multi-pole flat cable plug 36 for connection to bar 34.

Figures 4, 5:
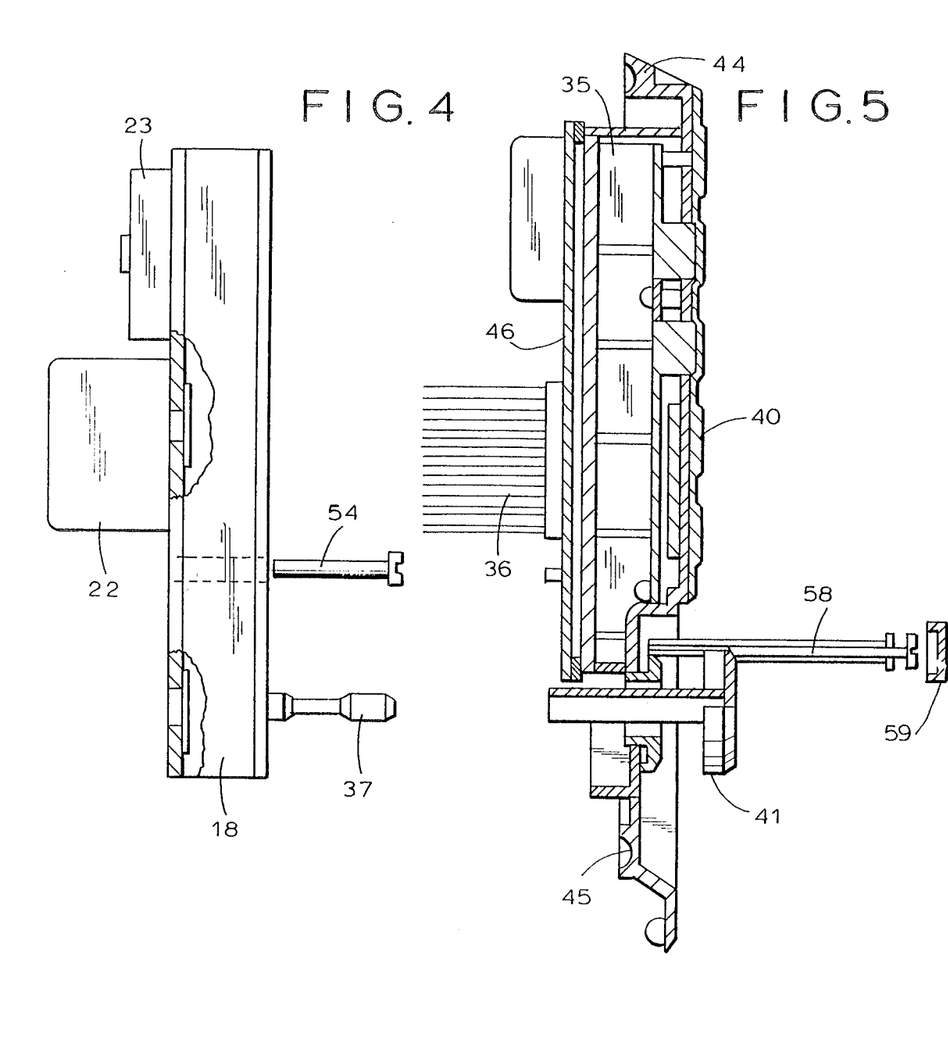
Figure 6:
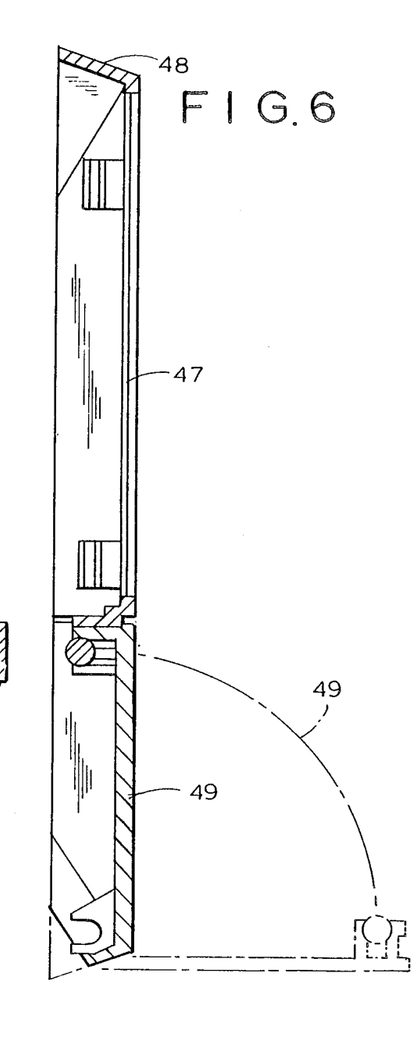

Motor reducer module 18 is equipped with manually actuable shafts 37, FIG. 4, of which two shafts are directly connectable to gears 29 of coupling 27 for cold and hot water valves 12,13, while being decoupled from transmissions of motors 21,22. The third shaft 37 is continuously in communication by way of a belt drive, not shown, with external teeth 38 of coupling gear 27 associated with motor 23 for three-way valve 14.

Figure 1:
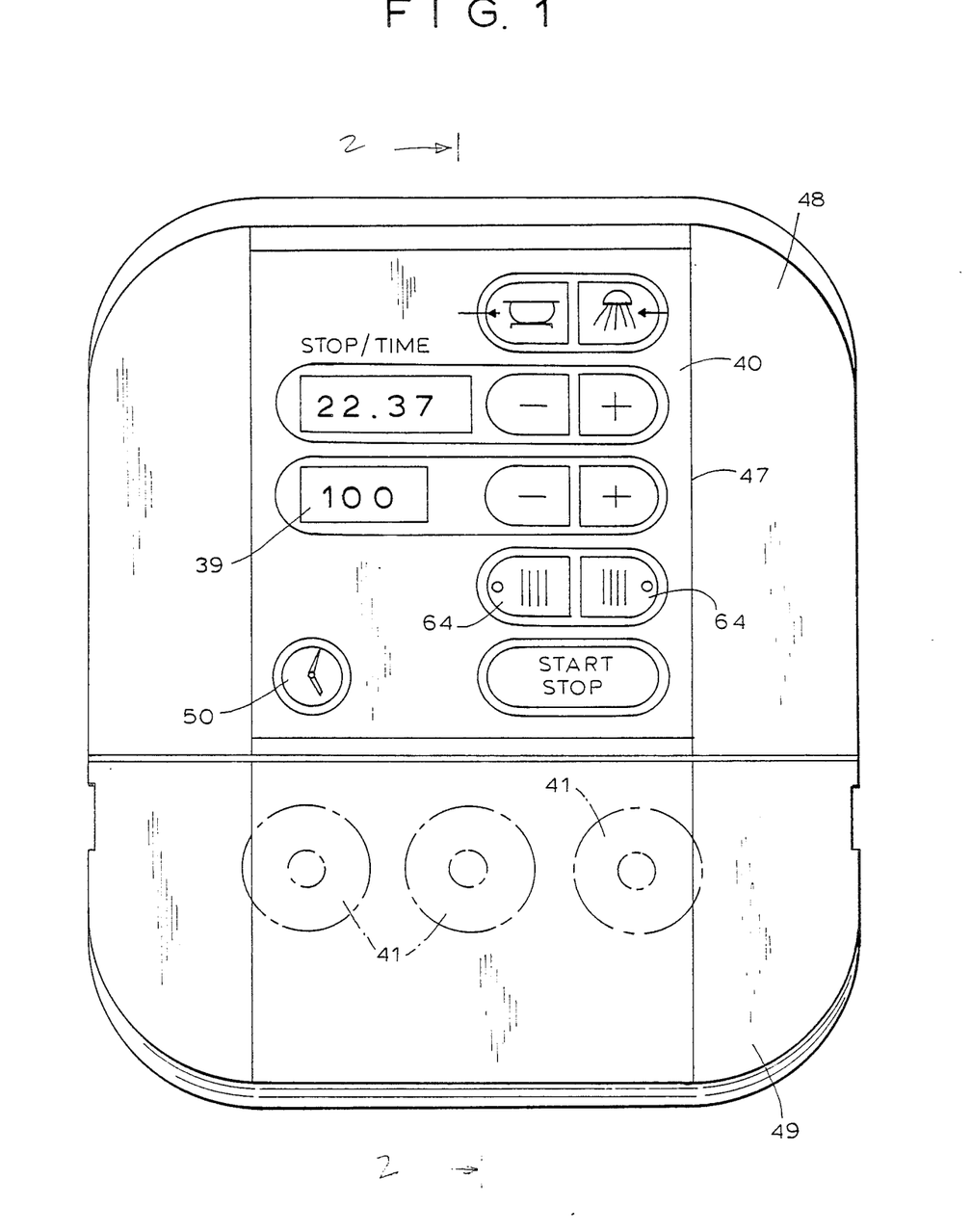
FIG. 1 is a front elevational view of a mixing fitting, according to the invention.
Figure 2:
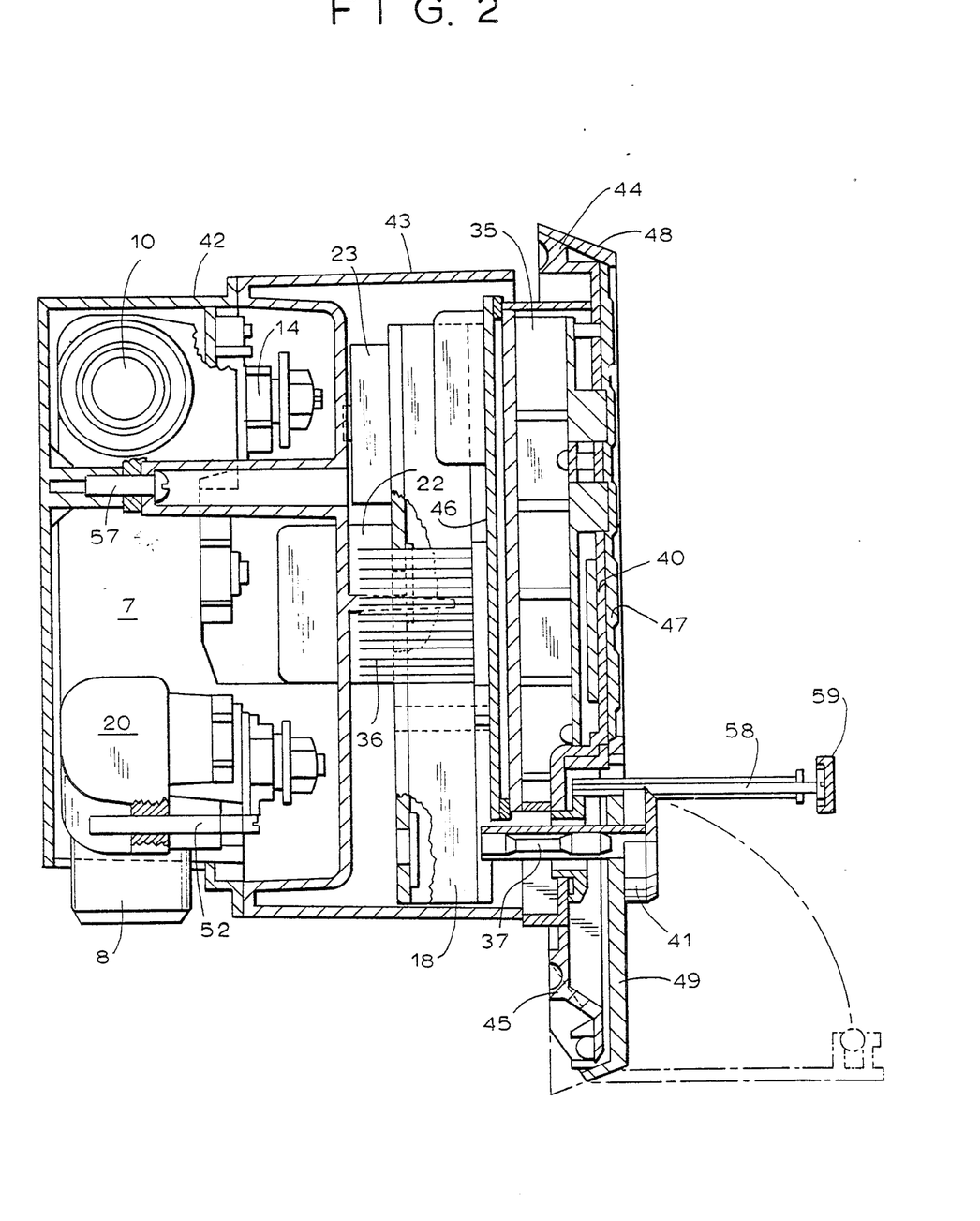
FIG. 2 is a sectional view in elevation, taken along line 2—2 of FIG. 1.

As shown, control module 35, FIG. 5, provides LED displays 39, FIG. 1, and a film keyboard 40 for the various functions, such as on and off switch, shower or tub flow and temperature setting, cold or hot water operation, time recall, and possible other functions.

Control module 35 is provided with handwheels 41, the outer two of which may be brought into engagement with gears 29 by way of two of the shafts 37 in the event of power failure associated with motors 21,22 for hot and cold water valves 12,13. Two outer handwheels 41 are pushed in somewhat in the event of power failure, thereby disengaging the associated motor reducers. In this way, the mixing fitting remains operational by manual actuation. As to the three-way valve 14, decoupling from the smaller motor is not required. Manual actuation is readily achieved, when needed, by way of intermediate handwheel 41 and the belt drive.

Figure 3:
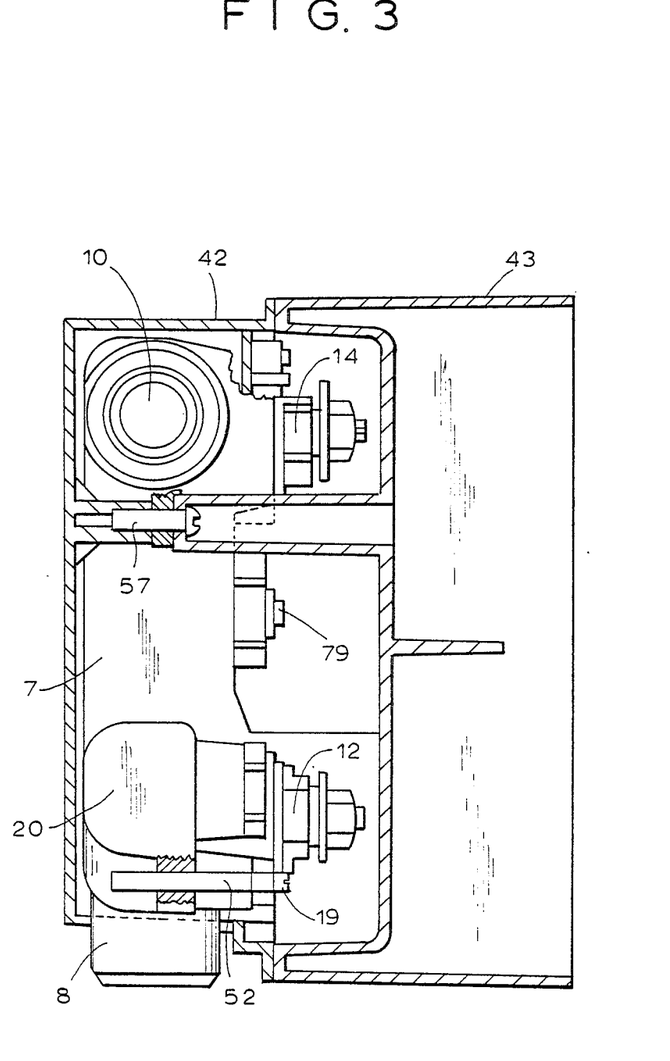
FIGS. 3, 4, 5 and 6 are sectional views in side elevation, of the various valve modules forming the assembly of FIG. 2.

Modules 7,18,35, shown in FIGS. 3, 4 and 5, are arranged in the opening of a wall, not shown. Valve module 7 is contained in a recessed box 42 and covered with a housing 43 before final installation, to be afterwards replaced by motor reducer module 18. The wall opening is closed watertight to the outside by control module 35. For this purpose, control module 35 is provided with a rim 44 to rest in contact with the wall, with interposition of a seal, not shown, disposed in a peripheral groove 45. Rim 44 is also connected watertight, welded to film keyboard 40, and is an integral part of housing 46 sealing the electronics of control module 35, of which housing, the wall forming keyboard 40 passes through opening 47 of a surround 48, by which it is encircled like a rosette. Surround 48 has a bottom flap 49 for access to handwheels 41, When flap 49 is open, the time may also be set after first pressing clock symbol key 50.

Valve module 7 and motor reducer module 18 are provided with openings 51 to accommodate centering pins 52 for positive centering between valve module 7 and motor reducer module 18. Valve module 7 has a threaded opening 53 for screw connection to motor reducer module 18, by screw 54 through hole 55 in motor reducer module 18. Valve module 7 is further provided with openings 56 for screw connection 57 to recessed box 42 and housing 43.

Control module 35 is connected by two screws 58 to motor reducer module 18. Screws 58 are splashproofed from the outside by caps 59.

Figure 7:
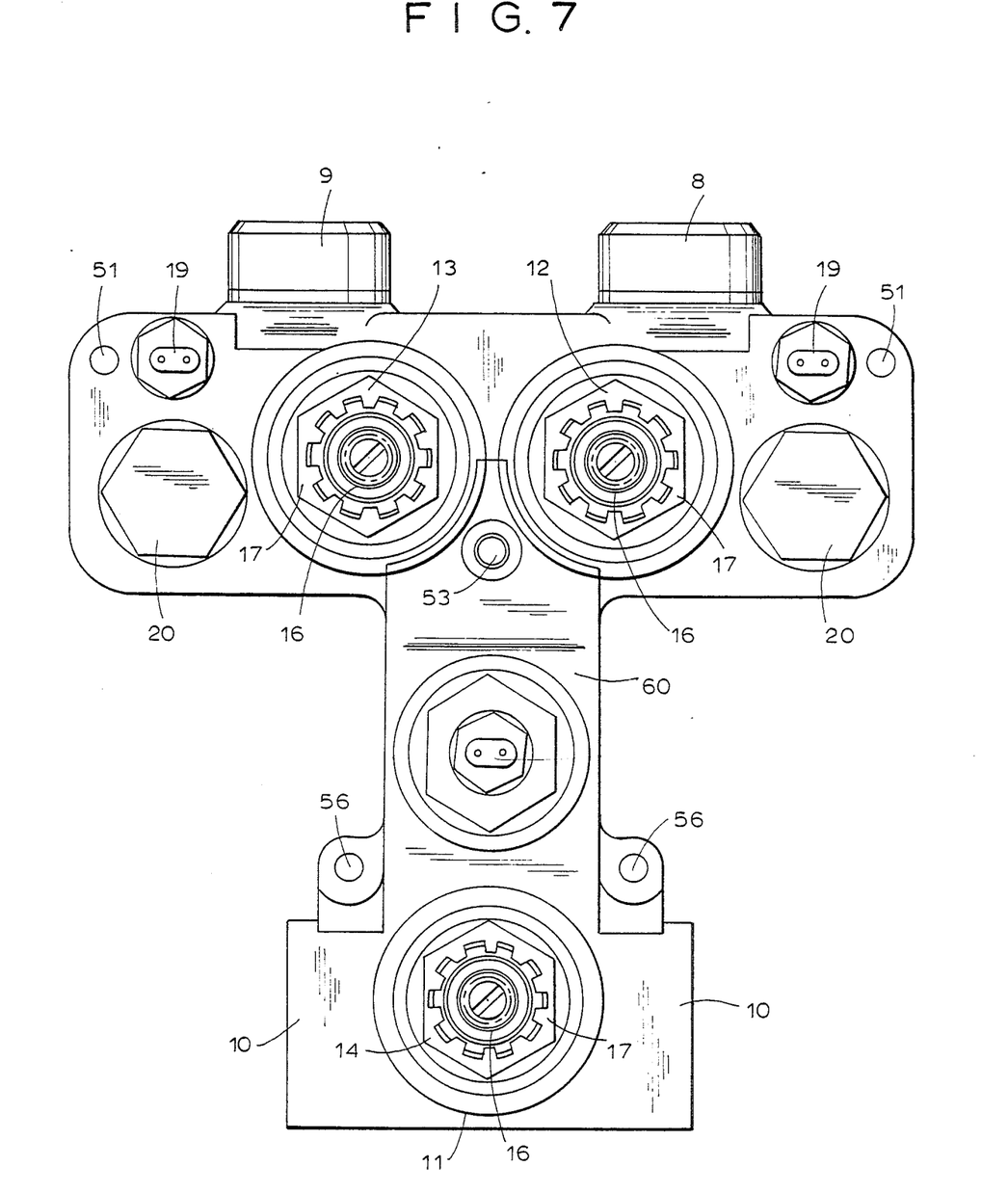
FIG. 7 is a front plan view, in elevation, of the valve module.

Valves 12,13,14 are held in a T-shaped body 60, FIG. 7, and motors 21,22,23, FIG. 8, are laterally offset from valves 12,13,14 so that after structural assembly of modules 7,18,35, they are positioned about in the plane of valves 12,13,14.

Figure 10:
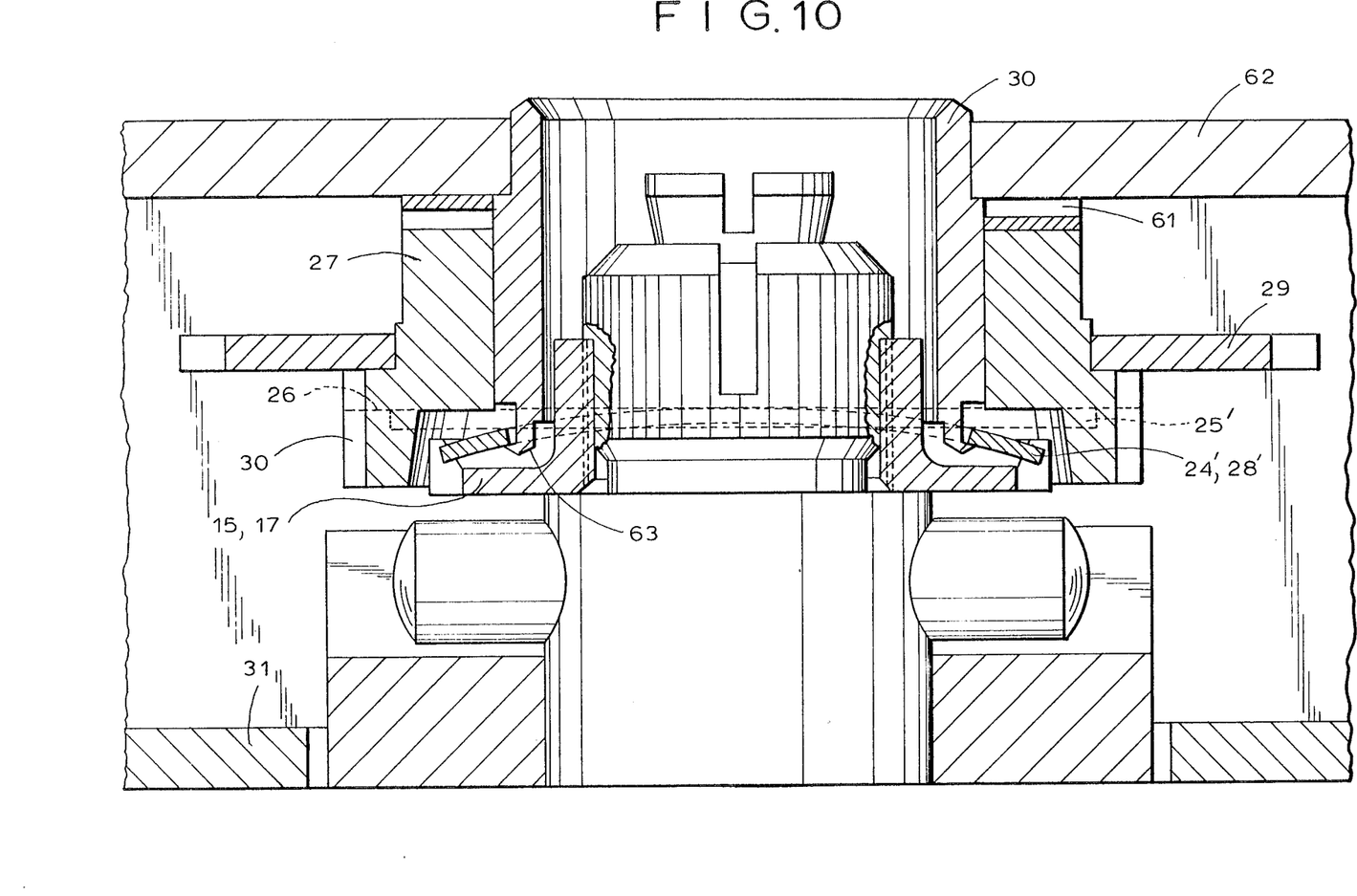
FIG. 10 is a sectional view similar to FIG. 9, illustrating another embodiment of the invention.

According to a further embodiment, shown in FIG. 10, cross-couplings 24' may be alternatively rigid with longer and shorter fingers 25' and 28'. The engagement of cross-coupling 24' is assisted by corrugated springs 61 provided between coupling gears 27 and the one wall 62 of motor reducer module 18. Cross-couplings 24,24' are captured behind lugs 63 of bearings 30.

Independently of the position of valves 12,13,14 and hence of teeth 17 of coupling flange 15, the shorter fingers 28,28' of cross-couplings 24,24' will automatically mesh with flange teeth 15 after assembly of modules 7,35. Stripping or jamming by the screw connection of modules 7,18, owing to placement of cross-couplings 24,24' being in misengagement, is not possible.

As previously mentioned, the embodiments represented and described are only examples of the invention, and the latter is not limited thereto, rather there are still other possibilities and variations within the scope of the invention. Thus, besides rotary drives such as for example, direct-current motors, linear motors may be employed instead, their physical principles being electromagnetic, piezoelectric or thermal. Also, still other functions are conceivable, for example, automatic actuation of a drain valve. As to the keys 64, for cold water only or hot water only, right or left respectively, to avoid accidental scalding the "START-STOP" key must be pressed after pressing the lefthand key 64 if hot water operation is intended. As to the "VOL. IN %", provision is made so that a setting from 20% is available for shower operation and any volume setting for tub operation. The valves 12,13,14 are of conventional type, with cartridge-shaped housing 63 and stops 66. Lastly, of course, surface-mounted designs may be preferred, as well as variants serving purposes other than tub and shower operation.

It is claimed:

1. A temperature-controlled mixing fitting having hot and cold water inlets and a discharge passageway comprising:

a control module housing electronic means, operably coupled to a valve module having at least one valve for mixing, shutting off and distribution of water flow therethrough, with at least one temperature sensor operably coupled to said discharge passageway and being in fluid communication therewith, said control module including manual means for operating said fitting due to a power failure, and an electromechanical motor module including electronically operated drive means and being adapted to electrically connect at least one motor and said at least one temperature sensor for automatically controlling the flow of hot and cold water discharged through said passageway.

2. The mixing fitting, in accordance with claim 1, wherein:

said valve module includes at least one cold water inlet, a hot water inlet and a mixed water outlet, with apertures to which are mounted a hot water and a cold water valve, each of said valves having temperature sensors operably mounted thereto, and a temperature sensor operably mounted to said mixed water outlet, a motor/transmission module having at least one motor for cold water and one motor for hot water, each motor having a means for coupling a gear unit and a manual operating means, said coupling means including electrical contacts for electrically connecting each temperature sensor.

3. The mixing fitting, in accordance with claim 2, wherein said motor/transmission module includes a printed circuit board which is disposed adjacent to said valve module, said printed circuit board having circuitry for electrically operating said temperature sensors and said motors of said mixing fitting.

4. The mixing fitting, in accordance with claim 1, wherein said control module includes plug means to electrically connect a printed circuit board housed therein with said motor/transmission module.

5. An electronically temperature-controlled mixing fitting for sanitary use, comprising:

a valve module having hot and cold water inlets, a discharge passageway and at least one valve for mixing, shutting off and proportioning of water flow through said fitting and at least one temperature sensor for the mixed water, an electromechanical motor module including at least one motor having electrical contacts and operably coupled to said at least one temperature sensor, and drive means for electrically operating said at least one valve in response to an electrical signal received from said at least one temperature sensor, and a control module housing electronic means for operating said fitting and including manual means for operating said fitting due to a power failure.

6. The mixing fitting, in accordance with claim 2, wherein said control module includes a keypad having indicator means for the various functions for operating said fitting.

* * * * *